(12) United States Patent
Imoto et al.

(10) Patent No.: US 12,195,386 B2
(45) Date of Patent: Jan. 14, 2025

(54) CHEMICALLY STRENGTHENED GLASS AND MANUFACTURING METHOD OF CHEMICALLY STRENGTHENED GLASS

(71) Applicant: AGC INC., Tokyo (JP)

(72) Inventors: Yuji Imoto, Tokyo (JP); Yusuke Fujiwara, Tokyo (JP)

(73) Assignee: AGC INC., Tokyo (JP)

( * ) Notice: Subject to any disclaimer, the term of this patent is extended or adjusted under 35 U.S.C. 154(b) by 404 days.

(21) Appl. No.: 17/656,470

(22) Filed: Mar. 25, 2022

(65) Prior Publication Data

US 2022/0306528 A1 Sep. 29, 2022

(30) Foreign Application Priority Data

Mar. 26, 2021 (JP) .................. 2021-053744

(51) Int. Cl.
*C03C 21/00* (2006.01)
*C03C 15/00* (2006.01)
*C09G 1/02* (2006.01)

(52) U.S. Cl.
CPC ............ *C03C 21/002* (2013.01); *C03C 15/00* (2013.01); *C03C 2203/50* (2013.01); *C09G 1/02* (2013.01); *Y10T 428/315* (2015.01)

(58) Field of Classification Search
None
See application file for complete search history.

(56) References Cited

U.S. PATENT DOCUMENTS

| 6,120,571 | A | 9/2000 | Aihara et al. |
| 2010/0072417 | A1 | 3/2010 | Criniere |
| 2018/0319696 | A1* | 11/2018 | Akiba ............... C03C 21/002 |
| 2019/0011954 | A1 | 1/2019 | Chu et al. |
| 2019/0022980 | A1 | 1/2019 | Chu et al. |
| 2020/0287156 | A1 | 9/2020 | Baby et al. |
| 2021/0014992 | A1* | 1/2021 | Limarga .............. G02B 1/18 |
| 2021/0206145 | A1 | 7/2021 | Chu et al. |

FOREIGN PATENT DOCUMENTS

| JP | 11-12561 | A | | 1/1999 | |
| JP | 2001-35818 | A | | 2/2001 | |
| JP | 2010-505735 | A | | 2/2010 | |
| JP | 2017149628 | A | * | 8/2017 | ........... C03C 21/002 |
| JP | 2019-504812 | A | | 2/2019 | |
| JP | 2020-537185 | A | | 12/2020 | |

* cited by examiner

*Primary Examiner* — David Sample
(74) *Attorney, Agent, or Firm* — Oblon, McClelland, Maier & Neustadt, L.L.P.

(57) ABSTRACT

The present invention relates to a chemically strengthened glass including alkali metal ions, having a thickness of 0.20 mm or smaller, and having a pair of major surfaces that are opposed to each other and have been subjected to a chemically strengthening treatment, in which at least one of the pair of major surfaces has a core roughness depth Sk of 0.90 nm or smaller and a mean summit curvature Ssc of $13.0 \times 10^{-4}$/nm or smaller.

15 Claims, 6 Drawing Sheets

CHEMICALLY STRENGTHENED GLASS AND MANUFACTURING METHOD OF CHEMICALLY STRENGTHENED GLASS

TECHNICAL FIELD

The present invention relates to a chemically strengthened glass and manufacturing method of a chemically strengthened glass.

BACKGROUND ART

From the viewpoint of increased appearance, cover glasses made of glass are demanded as display protection covers for devices such as smartphones. Although glass is high in theoretical strength, its strength lowers to a large extent when scratched. Thus, chemically strengthened glass in which a compressive stress layer is formed adjacent to a glass surface(s) by ion exchange is used for cover glasses that are desired to be high in strength such as impact resistance.

On the other hand, to accommodate recent new technologies and new products, extremely thin cover glasses are also demanded. Extremely thin cover glasses are required to be not only light by virtue of thinning but also high in crack strength and bending strength so as to be applicable to such products as foldable devices.

Patent document 1 discloses, as a cover element for a foldable device, a particular cover element that is equipped with a foldable glass element of about 25 μm to about 200 μm in thickness and a polymer layer that is disposed on a first major surface of the foldable glass element and is about 10 μm to about 100 μm in thickness.

Patent document 2 discloses a foldable electronic device module including: a cover element that is about 25 μm to about 200 μm in thickness and about 20 GPa to about 140 GPa in cover element elastic modulus and includes a constituent element that is of a glass composition and has a first major surface and a second major surface; an intermediate layer that is about 0.01 GPa to about 10 GPa in intermediate layer elastic modulus and about 50 μm to about 200 μm in thickness; and an adhesive that joins the cover element and the intermediate layer to each other and is about 5 μm to about 25 μm in thickness.

Patent document 1: JP-T-2019-504812 (The symbol "JP-T" as used herein means a published Japanese translation of a PCT patent application.)
Patent document 2: JP-T-2020-537185

The cover element disclosed in Patent document 1 has an ability to withstand impact of a pen drop height that is as large as at least 1.5 times a bearable pen drop height of a cover element not having a polymer layer. It is stated that this cover element allows construction of a foldable electronic device assembly capable of withstanding impact of a pen drop height that is larger than 8 cm in a prescribed drop test.

The device module disclosed in Patent document 2 is stated to have impact resistance that is characterized by an average pen drop height of about 6 cm or more against a series of impact exerted on the cover element in a pen drop test.

However, in the foldable electronic device disclosed in Patent document 1, the cover element is given the ability to withstand impact of a large pen drop height as mentioned above because it has the polymer layer and the glass element itself is low in the ability to withstand impact of a pen drop height. Although the cover element disclosed in Patent document 2 exhibits prescribed strength in the pen drop test, it cannot be said the test conditions of the pen drop test are very severe, considering the weight and the tip diameter of the pen used for the pen drop test. Because of these facts, cover glasses to be used in foldable devices are desired to be improved in crack strength as evaluated by the pen drop test.

SUMMARY OF INVENTION

In view of the above, an object of the present invention is to provide a chemically strengthened glass that can be applied to cover glasses of foldable devices etc. and exhibits high crack strength in the pen drop test as well as a manufacturing method thereof.

In the case of a chemically strengthened glass sheet that is an extremely thin sheet, for example, having a thickness of 0.2 mm or smaller, when an object having a sharp tip collides with it like the pen drop test, its surface opposite to the surface, with which a pen or the like has collided, of the cover glass cracks. Such cracking does not occur when a target chemically strengthened glass sheet is sufficiently thick.

The present inventors have studied diligently about cracking of a chemically strengthened glass sheet that is an extremely thin sheet and has found that the cracking relates to the surface roughness among the surface properties of chemically strengthened glass and, furthermore, has particularly strong correlations with the core roughness depth Sk and the mean summit curvature Ssc. That is, the inventors have found that the above object can be attained by causing the core roughness depth Sk and the mean summit curvature Ssc of a major surface of chemically strengthened glass to fall within prescribed ranges and completed the invention.

The invention and its embodiment provide the following chemically strengthened glass and the manufacturing method of chemically strengthened glass of items [1] to [15]:

[1] A chemically strengthened glass including alkali metal ions,
having a thickness of 0.20 mm or smaller, and
having a pair of major surfaces that are opposed to each other and have been subjected to a chemically strengthening treatment,
in which at least one of the pair of major surfaces has a core roughness depth Sk of 0.90 nm or smaller and a mean summit curvature Ssc of $13.0 \times 10^{-4}$/nm or smaller.

[2] The chemically strengthened glass according to item [1], in which the at least one of the pair of major surfaces has a density of summits Sds of 125/μm² or lower.

[3] The chemically strengthened glass according to item [1] or [2], that is capable of being bent so as to have a bend radius R of 20 mm or smaller.

[4] The chemically strengthened glass according to any one of items [1] to [3], in which at least one of the pair of major surfaces has a compressive stress layer depth of 4 μm to 30 μm.

[5] The chemically strengthened glass according to any one of items [1] to [4], in which at least one of the pair of major surfaces has a surface compressive stress value CS of 300 MPa to 1,400 MPa.

[6] A manufacturing method of a chemically strengthened glass, the method including:
preparing a glass sheet having a thickness of 0.20 mm or smaller and including alkali metal ions;

performing an ion exchange treatment of replacing the alkali metal ions existing in a surface of the glass sheet with alkali metal ions of another kind having larger ion radius than ion radius of the alkali metal ions in the surface of the glass sheet; and polishing at least one major surface of the glass sheet at least one of before and after the ion exchange treatment so as to obtain a core roughness depth Sk of 0.90 nm or smaller and a mean summit curvature Ssc of 13.0× $10^{-4}$/nm or smaller.

[7] The manufacturing method of a chemically strengthened glass according to item [6], in which the polishing is executed using colloidal silica as abrasive grains.

[8] The manufacturing method of a chemically strengthened glass according to item [7], in which the colloidal silica has an average particle diameter of 1 nm to 100 nm.

[9] The manufacturing method of a chemically strengthened glass according to item [7] or [8], in which the polishing is executed using cerium oxide as abrasive grains and then executed using colloidal silica as abrasive grains.

[10] The manufacturing method of a chemically strengthened glass according to item [9], in which the cerium oxide has an average particle diameter of 0.05 μm to 5 μm.

[11] The manufacturing method of a chemically strengthened glass according to any one of items [6] to [10], in which the ion exchange treatment is performed in an atmosphere having a dew point temperature of 20° C. or higher.

[12] The manufacturing method of a chemically strengthened glass according to any one of items [6] to [11], in which the alkali metal ions contained in the glass sheet include sodium ions, and in which in the ion exchange treatment, by bringing the glass sheet into contact with an inorganic salt composition including potassium nitrate and at least one kind of flux selected from the group consisting of $K_2CO_3$, $Na_2CO_3$, $KHCO_3$, $K_3PO_4$, $Na_3PO_4$, $K_2SO_4$, $Na_2SO_4$, KOH, and NaOH, the sodium ions are replaced by potassium ions existing in the inorganic salt composition.

[13] The manufacturing method of a chemically strengthened glass according to any one of items [6] to [12], further including cutting the glass sheet by chemical etching or short pulse laser light before executing the ion exchange treatment.

[14] The manufacturing method of a chemically strengthened glass according to item [13], in which the cutting is executed by bringing a cutting portion into contact with an aqueous solution including hydrofluoric acid.

[15] The manufacturing method of a chemically strengthened glass according to item [13] or [14], further including chemically etching only an end surface as a cut surface after executing the cutting and before executing the ion exchange treatment.

The invention can realize chemically strengthened glass that exhibits high crack strength in the pen drop test even in a case that it is thin. Chemically strengthened glass according to the invention is thus very high in reliability when it is applied to devices that are required to be reduced in weight and cover glasses that are required to be foldable such as foldable devices.

DESCRIPTION OF EMBODIMENT

Although the present invention will be described detail, the invention is not limited to the following embodiment and can be modified in a desirable manner without departing from the gist of the invention. The symbol "-" or the word "to" is used in such a sense that a numerical value range concerned includes numerical values written before and after it as a lower limit value and an upper limit value, respectively.

<Chemically Strengthened Glass>

Chemically strengthened glass (hereinafter may be referred to simply as "glass") according to the embodiment is a very thin sheet that is 0.20 mm or less in thickness. Chemically strengthened glass includes alkali metal ions and has a pair of major surfaces opposed to each other that have been subjected to chemically strengthening treatment. In at least one of the pair of major surfaces, the core roughness depth Sk is 0.90 nm or smaller and the mean summit curvature Ssc is $13.0 \times 10^{-4}$/nm or smaller.

Figure 1:
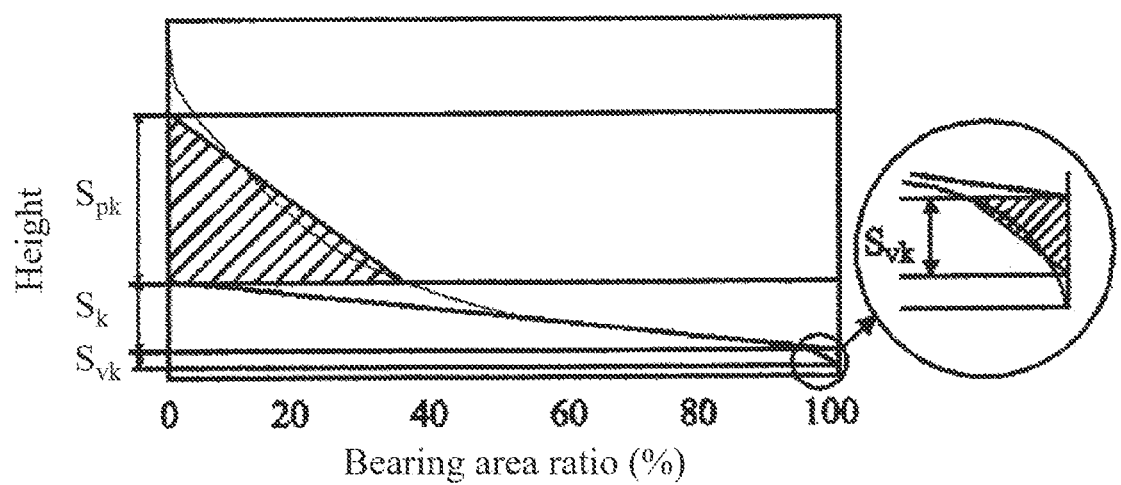
FIG. 1 is a graph for description of the core roughness depth Sk.

The core roughness depth Sk (DIN 4776 (1990)), which is a parameter representing a variation of peak/valley roughness of a glass surface, is the height of an intercept of a minimum gradient line among approximation lines of an Abbott curve shown in FIG. 1, that is, a bearing curve of integration values of a histogram of a height distribution.

This specification employs a core roughness depth Sk value that is obtained by a surface analysis using an AFM (atomic force microscope) and SPIP software (see a measuring method described below).

Measuring Method of "Core Roughness Depth Sk"

First, a shape image is acquired by the AFM (XE-HDM produced by Park Systems, measurement mode: noncontact mode, scan size: 10 μm×5 μm, color scale: ±1 nm, scan rate: 1 Hz, cantilever: non-contact cantilever (PPP-NCHR 10M produced by Park Systems)). Subsequently, the shape image is subjected to leveling and L-filtering (ISO value: 2.0 μm) using image analysis software (SPIP 6.2.6 produced by Image Metrology A/S) and a core roughness depth Sk is determined by a roughness analysis.

The mean summit curvature Ssc is an arithmetic mean of curvatures of tips of peak portions, that is, summits, of a glass surface and is calculated according to the following equation:

$$Ssc = \frac{-1}{2n} \sum_{i=1}^{n} \left\{ \frac{\delta^2 Z(X_i, Y_i)}{\delta X^2} + \frac{\delta^2 Z(X_i, Y_i)}{\delta Y^2} \right\} \quad \text{[Formula 1]}$$

In the above equation, n is the number of summits and Z is the height of summits (convex) in a surface observation sample. Variables X and Y are an X coordinate and a Y coordinate in the observation surface and hence (X, Y) represents the position of a summit in the observation surface. (Xi, Yi) is the coordinates of an i-th summit.

A larger mean summit curvature Ssc value in an observation surface means that summits in the plane are sharper, and a smaller mean summit curvature Ssc value means that summits are more rounded. This specification employs a mean summit curvature Ssc value that is obtained by a surface analysis using an AFM (atomic force microscope) and SPIP software and calculated in the same manner as in the case using the above equation. A specific measuring method is as described below. The mean summit curvature is the same as a curvature that is called a mean maximum curvature.

Measurement Method of "Mean Summit Curvature Ssc"

First, a shape image is acquired by an AFM (XE-HDM produced by Park Systems, measurement mode: noncontact mode, scan size: 10 μm×5 μm, color scale: ±1 nm, scan rate: 1 Hz, cantilever: non-contact cantilever (PPP-NCHR 10M produced by Park Systems)). Subsequently, the shape image is subjected to leveling and L-filtering (ISO value: 2.0 μm) using the image analysis software (SPIP 6.2.6 produced by Image Metrology A/S) and a mean summit curvature Ssc is determined by a roughness analysis.

At least one major surface of the chemically strengthened glass according to the embodiment has a core roughness depth Sk of 0.90 nm or smaller and a mean summit curvature Ssc of $13.0 \times 10^{-4}$/nm or smaller. Where chemically strengthened glass that is 0.2 mm or smaller in thickness satisfies these conditions, the crack strength evaluated by the pen drop test (hereinafter simply referred to as "crack strength") is made good.

Figure 2:
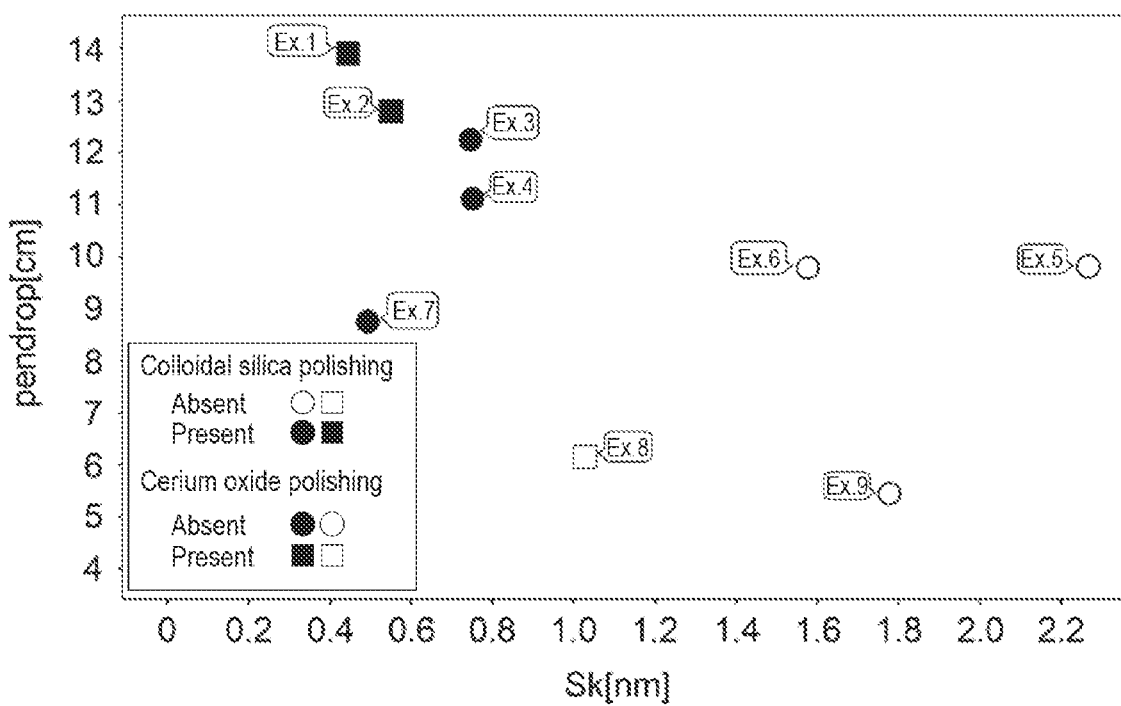
FIG. 2 is a graph showing a relationship between the core roughness depth Sk of a major surface of chemically strengthened glass and its crack strength.

When the glass surface is polished, the core roughness depth Sk tends to decrease because a curve in a large-height region of a bearing curve moves downward and a curve in a small-height region moves upward. The core roughness depth Sk of a glass surface being 0.90 nm or smaller in the embodiment means that in the glass surface the proportion of small concave and convex is large. FIG. 2 shows results of Inventive Examples and Comparative Examples, from which it was found that the core roughness depth Sk and the crack strength measured by the pen drop test have a correlation. Where concave and convex in a glass surface are large, local concentration of stress tends to occur at concave and convex in the pen drop test, resulting in reduction of the crack strength in the pen drop test. This is considered to cause reduction in crack strength in the pen drop test. Conversely, where the proportion of small concave and convex in a glass surface is large, local concentration of stress does not tend to occur at concave and convex in the pen drop test, resulting in increase of the crack strength in the pen drop test.

However, merely the finding that the core roughness depth Sk correlates with the crack strength to some extent is insufficient for interpretation of the crack strength, that is, insufficient for satisfactory regression.

Figure 3:
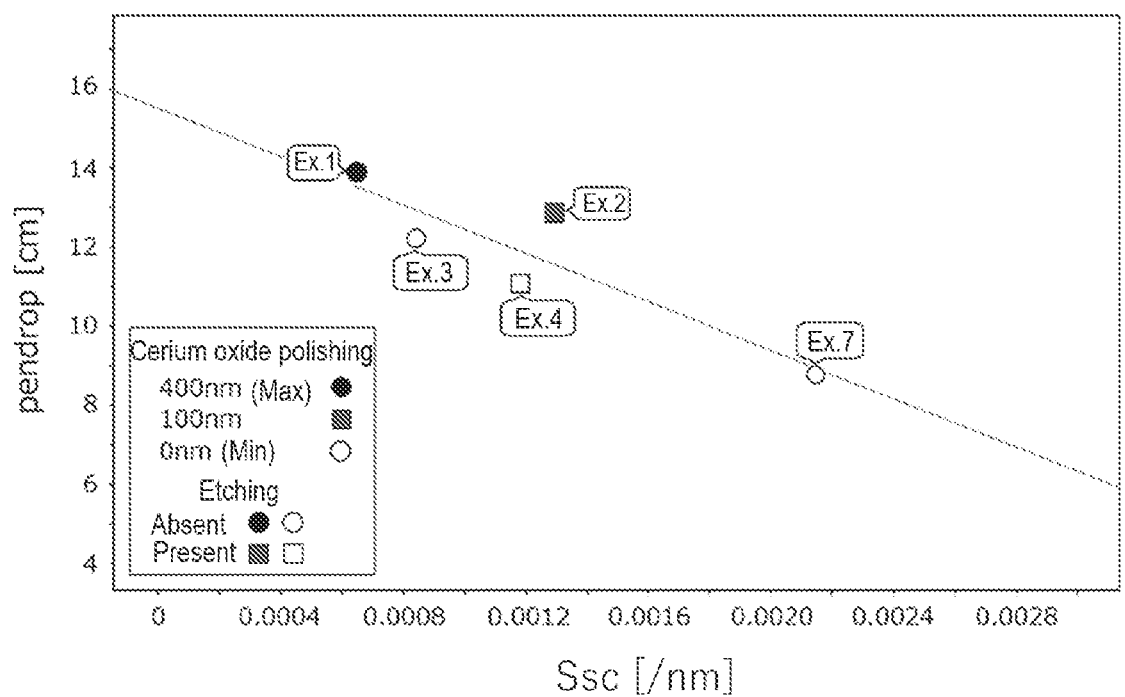
FIG. 3 is a graph showing a relationship between the mean summit curvature Ssc of a major surface of chemically strengthened glass and its crack strength.

In view of the above, the inventors paid attention to the mean summit curvature Ssc among a very large number of parameters and have found that as shown in FIG. 3 the crack strength in the pen drop test decreases as the mean summit curvature Ssc increases, that is, a correlation exists between the mean summit curvature Ssc and the crack strength in the pen drop test. This is explained as follows: in the pen drop test, local stress concentration tends to occur at large-curvature summits to possibly serve as driving force of local destruction. FIG. 3 shows results of Inventive Examples and Comparative Examples, based on which the inventors have found that crack strength data can be interpreted satisfactorily by regression whereas the use of only the core roughness depth Sk is insufficient to do so. From the above, it is considered that the crack strength in the pen drop test can be increased by restricting an overall concave/convex size distribution in a glass surface and, in addition, making local stress concentration least likely to occur by decreasing the mean summit curvature Ssc.

That is, it has been found that to increase the crack strength of chemically strengthened glass in the pen drop test, merely making the core roughness depth Sk small is insufficient and it is also necessary to control the mean summit curvature Ssc.

In the embodiment, the core roughness depth Sk of a major surface of chemically strengthened glass is made 0.90 nm or smaller and the mean summit curvature Ssc is made $13.0 \times 10^{-4}$/nm or smaller.

The core roughness depth Sk is preferably 0.80 nm or smaller and even preferably 0.70 nm or smaller. Although there are no particular limitations on the lower limit of the core roughness depth Sk, it is usually 0.20 nm or larger.

The mean summit curvature Ssc is preferably $12.0 \times 10^{-4}$/nm or smaller, even preferably $10.0 \times 10^{-4}$/nm or smaller, and further preferably $9.0 \times 10^{-4}$/nm or smaller. Although there are no particular limitations on the lower limit of the mean summit curvature Ssc, it is usually $4.0 \times 10^{-4}$/nm or larger.

The crack strength of chemically strengthened glass can be increased by these measures.

The core roughness depth Sk and the mean summit curvature Ssc can be controlled by polishing of a glass major surface (described later). The core roughness depth Sk and the mean summit curvature Ssc can be decreased by performing polishing using colloidal silica as abrasive grains. The core roughness depth Sk can be decreased in a shorter time by performing polishing using cerium oxide as abrasive grains before polishing using colloidal silica as abrasive grains. The mean summit curvature Ssc can be controlled more properly by thereafter performing polishing using colloidal silica as abrasive grains.

It is preferable to control the density of summits Sds in addition to performing the above controls.

Figure 4:
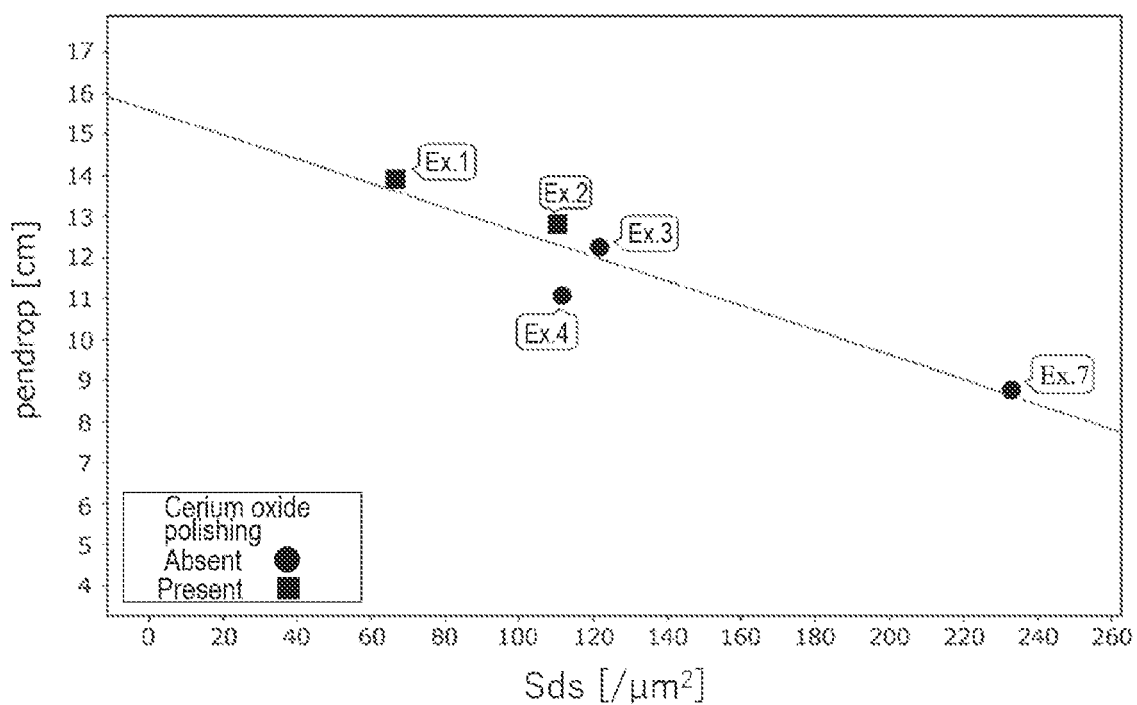
FIG. 4 is a graph showing a relationship between the density of summits Sds of a major surface of chemically strengthened glass and its crack strength.

The density of summits Sds means the number of points of local maximum heights, that is, the number of summits, per unit area 1 μm² in a glass surface. FIG. 4 shows a relationship between the density of summits Sds and the crack strength, from which it has been found that a certain correlation exists between them. That is, the crack strength in the pen drop test increases as the density of summits Sds becomes lower. This is explained as follows: when the density of summits Sds is lower, the flatness of a glass surface is higher and the number of convex that can be an origin of stress concentration at the time of reception of impact in the pen drop test is smaller. FIG. 4 shows results of Inventive Examples and Comparative Examples and will be described in detail later. The density of summits Sds employed in this specification is a density value of summits Sds obtained by a surface analysis using an AFM (atomic force microscope) and SPIP software. A specific measuring method will be described below.

Measuring Method of Density of Summits Sds

First, a shape image is acquired by the AFM (XE-HDM produced by Park Systems, measurement mode: noncontact mode, scan size: 10 μm×5 μm, color scale: ±1 nm, scan rate: 1 Hz, cantilever: non-contact cantilever (PPP-NCHR 10M produced by Park Systems)). Subsequently, the shape image is subjected to leveling and L-filtering (ISO value: 2.0 μm)

using the image analysis software (SPIP 6.2.6 produced by Image Metrology A/S) and a density of summits Sds is determined by a roughness analysis.

The density of summits Sds of a major surface of chemically strengthened glass is preferably $125/\mu m^2$ or lower, even preferably $115/\mu m^2$ or lower, further preferably $100/\mu m^2$ or lower, and even further preferably $90/\mu m^2$ or lower. Although there are no particular limitations on the lower limit of the density of summits Sds, it is usually $40/\mu m^2$ or higher.

Like the core roughness depth Sk and the mean summit curvature Ssc, the density of summits Sds can be controlled by the manner of polishing of a glass major surface, for example, by performing polishing using colloidal silica as abrasive grains. It is also preferable to perform polishing using cerium oxide as abrasive grains before polishing using colloidal silica as abrasive grains.

The crack strength of chemically strengthened glass is crack strength determined by a pen drop test that is performed under the following conditions.

Figure 5:
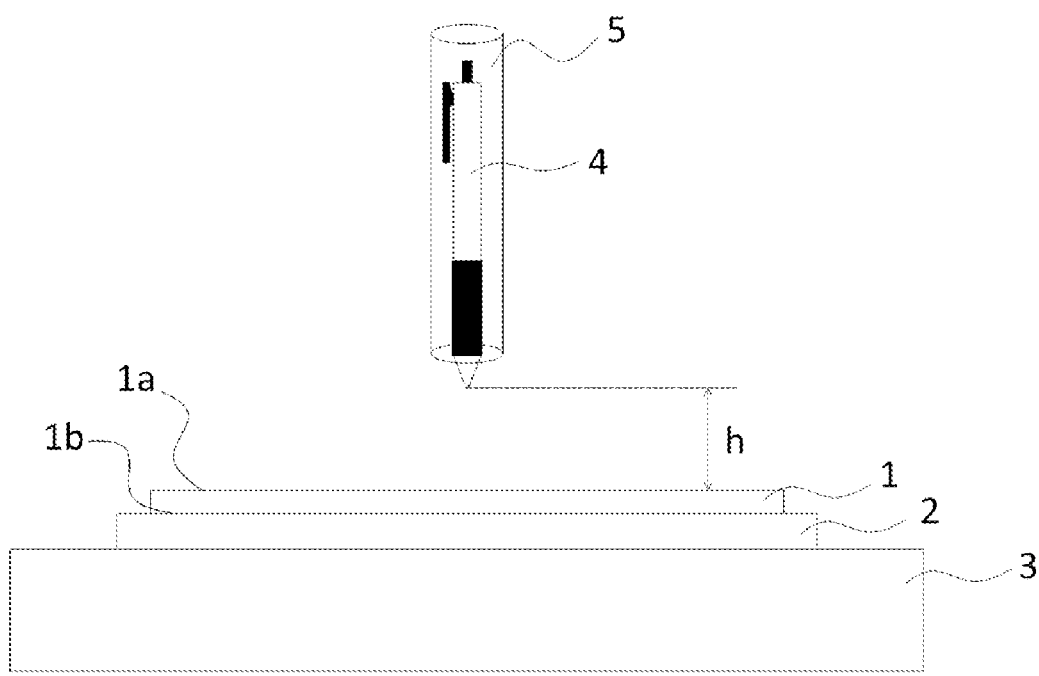
FIG. 5 is a schematic side view showing a pen drop test method employed in an embodiment.

FIG. 5 is a schematic side view showing a pen drop test method. A stage is prepared in which a PET (polyethylene terephthalate) film 2 is bonded to a stone surface plate 3 by an OCA (optical clear adhesive) sheet. The PET film 2 is 100 μm in thickness and 4 GPa in elastic modulus.

A chemically strengthened glass 1 is placed on the PET film 2 with its first major surface 1a up. The second major surface 1b of the chemically strengthened glass 1 is a surface that satisfies the core roughness depth Sk being 0.90 nm or smaller and the mean summit curvature Ssc being $13.0 \times 10^{-4}$/nm or smaller.

A pen 4 is fixed to a drop assist pipe 5 made of acrylic resin over the chemically strengthened glass 1 and only the pen 4 is caused to drop from a prescribed height. The tip of the pen 4 has a ball that is 0.5 mm in diameter and made of stainless steel. The weight of the pen 4 is adjusted to 12 g.

The height from which the pen 4 is dropped onto the major surface of the chemically strengthened glass 1 is increased in unit of 5 mm and a height h from the first major surface 1a of the chemically strengthened glass 1 to the tip of the pen 4 when a crack(s) occurred in the second major surface 1b of the chemically strengthened glass 1 is measured. As the tip of the pen 4 may be deformed by impact that the pen 4 receives when dropped, the tip of the pen 4 is confirmed to be not deformed by a microscope every time it has been dropped. If deformation is found, the pen 4 is replaced by one having no deformation at its tip. This measurement is performed at least five times and an average height is employed as a crack height of the pen drop test.

A preferable crack height value of the pen drop test depends on the use and structure of chemically strengthened glass. For example, where chemically strengthened glass is used as a cover glass of a foldable device so as to provide an outermost surface of an image display device and the glass thickness is 100 μm, the crack height is preferably 10 cm or larger and even preferably 12 cm or larger. Although there are no particular limitations on the upper limit of the crack height, it is usually 20 cm or smaller in the case where the glass thickness is 100 μm.

Where a chemically strengthened glass on which a resin film is laid is used as a constituent member of an image display device, the crack height is preferably 20 cm or larger and even preferably 30 cm or larger. Likewise, where a hard-coated chemically strengthened glass is used as a constituent member of an image display device, the crack height is preferably 20 cm or larger and even preferably 30 cm or larger.

The crack height of chemically strengthened glass in the pen drop test depends on not only its properties relating to its surface roughness but also the glass composition, thickness, conditions of chemically strengthening treatment, etc. This may make it difficult to determine a preferable absolute value.

In this connection, the advantages of the invention can be verified through comparison with a crack height that is measured by performing the pen drop test on unprocessed chemically strengthened glass obtained by performing only chemically strengthening treatment on glass, that is, not subjected to surface-roughness-related adjustments. The crack height of chemically strengthened glass according to the embodiment is preferably 1.4 or more times a crack height of unprocessed chemically strengthened glass, even preferably 1.6 times or more and further preferably 1.8 times or more. Although there are no particular limitations on the upper limit of the crack height, it is usually 3.0 or less times a crack height of unprocessed chemically strengthened glass.

As described above, a case that chemically strengthened glass according to the embodiment is used as a cover glass of a foldable device or the like is assumed as one use. With this assumption, it is intended to prevent an event that the surface, opposite to a surface with which an object having a sharp tip such as a pen used in the pen drop test collides, of the cover glass is cracked. Since such cracking does not occur in the case where chemically strengthened glass is sufficiently thick, the thickness of chemically strengthened glass is 0.20 mm or smaller. From the viewpoint of a minimum breaking bend radius of chemically strengthened glass when it is bent, the thickness of chemically strengthened glass is preferably 0.19 mm or smaller, even preferably 0.18 mm or smaller, and further preferably 0.17 mm or smaller. From the viewpoint of strength, the thickness of chemically strengthened glass is preferably 0.04 mm or larger, even preferably 0.05 mm or larger, further preferably 0.06 mm or larger, and even further preferably 0.08 mm or larger.

Where a chemically strengthened glass is used as a cover glass of a foldable display, it is preferable that its thickness t be 0.20 mm or smaller and it be able to be bent so as to have a bend radius R of curvature of 20 mm or less. The bend radius R of curvature is even preferably 18 mm or smaller, further preferably 16 mm or smaller, even further preferably 14 mm or smaller, particularly preferably 12 mm or smaller, and most preferably 10 mm or smaller. Although there are no particular limitations on the lower limit of the possible bend radius R of curvature, it is usually 1 mm or larger.

The possible bend radius R of curvature can be decreased by, for example, subjecting only end surfaces of a glass to chemical etching to increase their smoothness. The possible bend radius R can be decreased by increasing the surface compressive stress CS by chemically strengthening treatment or removing cracks and latent flaws existing on the major surfaces and end surfaces of a glass by subjecting it to acid treatment and alkali treatment after chemically strengthening treatment.

In this specification, a bend radius of curvature R of a chemically strengthened glass is a value obtained by a bending test method using a bending test machine.

Figure 6:
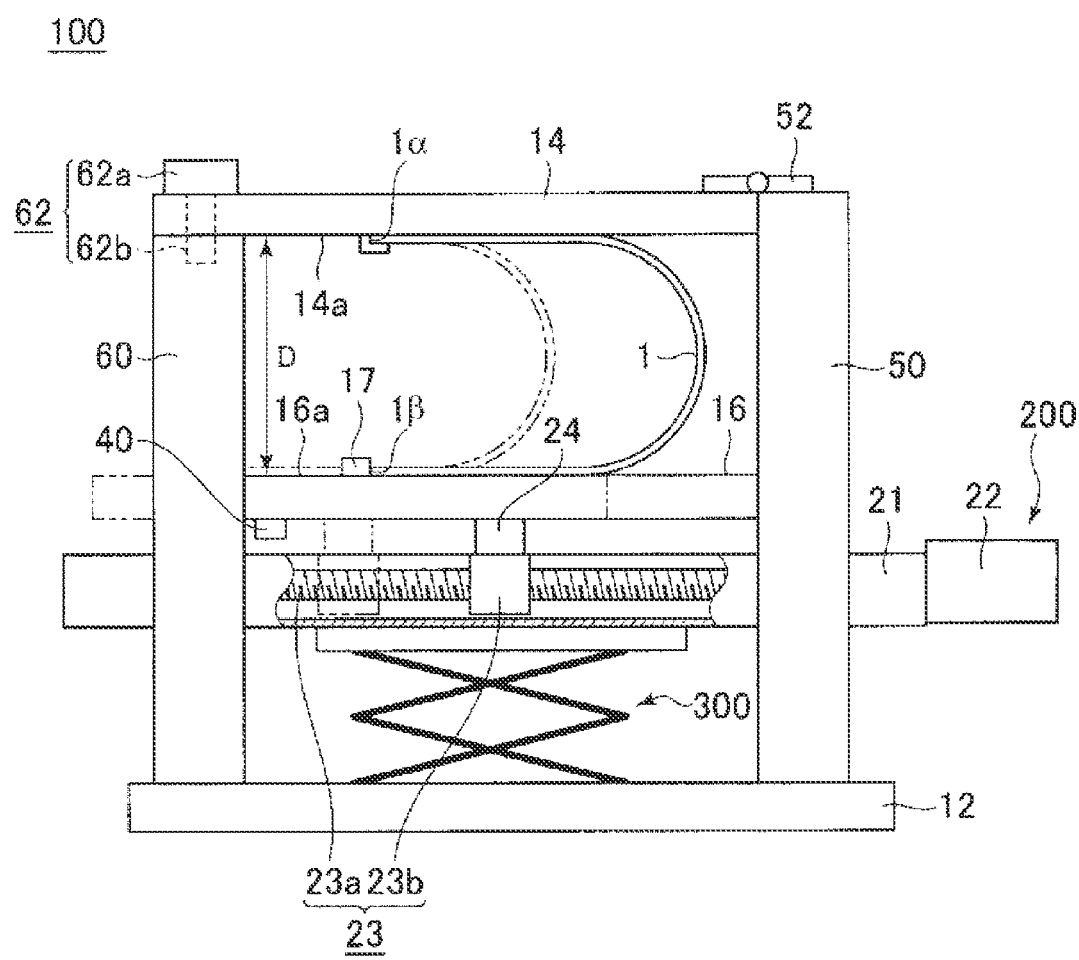
FIG. 6 is a side view for description of a bending test machine.

As shown in FIG. 6, a bending test machine 100 is a machine for bending a chemically strengthened glass 1 according to the embodiment. The durability of the chemically strengthened glass 1 can be judged by checking whether a crack(s) develops in the chemically strengthened glass 1 when it is bent.

As shown in FIG. 6, the bending test machine 100 includes a base 12, a first support board (upper support board) 14, a second support board (lower support board) 16, a moving member 200, an adjustment member 300, a detection member 40, a support portion 50, and a placement portion 60.

The first support board 14 supports an end portion 1α of a chemically strengthened glass 1. A support surface 14a of the first support board 14, which is bottom-side flat surface, is a surface to which the end portion 1α of the chemically strengthened glass 1 is fixed.

The second support board 16 supports an end portion 1β of the chemically strengthened glass 1 in the same manner as the first support board 14 does. A support surface 16a of the second support board 16, which is top-side flat surface, is a placement surface on which the end portion 1β of the chemically strengthened glass 1 is placed. The first support board 14 and the second support board 16 are arranged parallel with each other so that the support surface 14a of the first support board 14 and the support surface 16a of the second support board 16 are opposed to each other. The other end portion of the chemically strengthened glass 1 is pressed against the support surface 16a of the second support board 16 by gravity and fixed by frictional force. The support surface 16a of the second support board 16 is provided with a stopper 17 that is in contact with the end portion 1β of the chemically strengthened glass 1 to prevent displacement of the chemically strengthened glass 1.

The moving member 200 moves the second support board 16 with respect to the first support board 14 while the interval (D) between the support surface 14a of the first support board 14 and the support surface 16a of the second support board 16 which are parallel with each other is maintained. To move the second support board 16 with respect to the first support board 14, the moving member 200 moves the second support board 16 in a direction that is parallel with the base 12 such that the curving direction of the chemically strengthened glass 1 is not changed. If the second support board 16 is moved with respect to the base 12 in the direction that is perpendicular to the paper surface, the bending direction of the chemically strengthened glass 1 is changed and hence the bending test cannot be performed accurately.

The moving member 200 moves the second support board 16 parallel with the base 12. Alternatively, the moving member 200 may move the first support board 14 or move both of the first support board 14 and the second support board 16 in parallel with respect to the base 12. In either case, the position of the second support board 16 is changed with respect to the first support board 14.

The moving member 200 includes an elevation frame 21, a motor 22, a ball screw mechanism 23, a slider block 24, etc. The elevation frame 21 is movable with respect to the base 12. The motor 22 is attached to the elevation frame 21. The ball screw mechanism 23 converts a rotational movement of the motor 22 to a linear movement and gives it to the slider block 24. The slider block 24 is connected to the second support board 16 and moved parallel with the base 12 together with the second support board 16. The motor 22 rotates a ball screw shaft 23a and thereby moves a ball screw nut 23b under the control of a controller including a microcomputer, etc. As the ball screw nut 23b is moved, the slider block 24 and the second support board 16 are moved parallel with the base 12.

The adjustment member 300 adjusts the interval (D) between the support surface 14a of the first support board 14 and the support surface 16a of the second support board 16 which are parallel with each other. For example, the adjustment member 300 includes a pantograph-type jack.

The detection member 40 is a sensor (e.g., AE sensor) for detecting elastic waves such as AE (acoustic emission) waves that are generated when a crack(s) develops in the chemically strengthened glass 1. Whether a crack(s) has developed in the chemically strengthened glass 1 can be judged in the state that it is supported by the first support board 14 and the second support board 16. A crack(s) develops in the chemically strengthened glass 1 from an origin that is a defect such as flaw, a stuck substance, or an inclusion existing in the chemically strengthened glass 1. Whereas in the bending test machine 100 employed in the embodiment the detection member 40 is attached to the second support board 16 which supports the chemically strengthened glass 1, it may be attached to the first support board 14.

The support portion 50 is fixed to the base 12 and supports the first support board 14 via a link portion 52 such as a hinge so that the first support board 14 is rotatable. The first support board 14 is rotatable between a test position (first position) at which the support surface 14a of the first support board 14 is parallel with the support surface 16a of the second support board 16 and a setting position (second position) at which the support surface 14a of the first support board 14 is inclined with respect to the support surface 16a of the second support board 16. As the first support board 14 is rotated from the test position to the setting position, the radius of curvature of the bent portion of the chemically strengthened glass 1 supported by the support board 14 and the second support board 16 increases gradually.

The placement portion 60 is fixed to the base 12 and mounted with the first support board 14 which is disposed over the second support board 16. When the first support board 14 is located at the test position (i.e., the position shown in FIG. 6), it is mounted on upper end surface of the placement portion 60. The first support board 14 may be mounted on plural placement portions 60 so that the posture of the first support board 14 is made stable. The placement portion 60 is formed with a bolt hole to be threadedly engaged with a shank 62b of a bolt 62. The first support board 14 is formed with a through-hole through which the shank 62b of the bolt 62 is to penetrate. The first support board 14 is sandwiched between a head 62a of the bolt 62 and the placement portion 60, whereby the posture of the first support board 14 can be stabilized.

A test is performed using the above bending test machine according to the following bending test method.

(Bending Test Method)

The first support board and the second support board are arranged parallel with each other so that the support surface of the first support board and the support surface of the second support board are opposed to each other. End portions of a chemically strengthened glass are supported by the first support board and the second support board, respectively, and the interval between the support surface of the first support board and the support surface of the second support board is kept at an interval D that is given by the following equation. In this state, the second support board is reciprocated with respect to the first support board by a stroke of 100 mm in a direction that is parallel with the support surface of the first support board and the support surface of the second support board such that the curving direction of the chemically strengthened glass sheet is not changed, and it is checked whether a crack(s) develops in the chemically strengthened glass that is bent between the first support board and the second support board. A radius of curvature R is given by the following equation. An interval D that is used to calculate the radius of curvature R coincides with a value calculated by the following equation:

$$R=D/2.$$

$$D=(A\times E \times t/\sigma)+t$$

where
R: bend radius (mm) of the chemically strengthened glass;
D: interval (mm) between the support surface of the first support board and the support surface of the second support board;
A=1.198;
E: Young's modulus (MPa) of the chemically strengthened glass;
t: thickness (mm) of the chemically strengthened glass; and
σ: bending stress (MPa).

From the viewpoint of the bending strength, the surface compressive stress CS of chemically strengthened glass is preferably 300 MPa or larger, even preferably 500 MPa or larger, and further preferably 800 MPa or larger. From the viewpoint of preventing scattering of fragments at the time of fracture, the surface compressive stress CS is preferably 1,400 MPa or smaller, even preferably 1,300 MPa or smaller, and further preferably 1,200 MPa or smaller. A surface compressive stress CS and a compressive stress layer depth DOL that are used in this specification can be measured by an EPMA (electron probe microanalyzer) or a surface stress meter (e.g., FSM-6000 produced by Orihara Industrial Co., Ltd.).

From the viewpoint of the measurement lower limit of a surface stress meter, the compressive stress layer depth DOL of chemically strengthened glass is preferably 4 μm or larger, even preferably 4.5 μm or larger, further preferably 5 μm or larger. From the viewpoint of preventing scattering of fragments at the time of fracture, the compressive stress layer depth DOL is preferably 30 μm or smaller, even preferably 20 μm or smaller, and further preferably 10 μm or smaller.

<Manufacturing Method of Chemically Strengthened Glass>

A manufacturing method of a chemically strengthened glass includes a step of preparing a glass sheet including alkali metal ions and having a thickness of 0.20 mm or smaller, a step of performing ion exchange treatment of replacing the alkali metal ions in a surface of the glass sheet with alkali metal ions of another kind having a larger ion diameter than the above alkali metal ions, and a step of polishing at least one major surface of the glass sheet.

The polishing step may be executed at least one of before and after the step of performing ion exchange treatment, whereby the core roughness depth Sk and the mean summit curvature Ssc of the major surface of the chemically strengthened glass are made 0.90 nm or smaller and 13.0× $10^{-4}$/nm or smaller, respectively.

The polishing step is preferably executed after the step of performing ion exchange treatment because in that case minute flaws that have been formed in a glass surface before and during the ion exchange treatment can be removed.

It is preferable that the manufacturing method further includes, between the glass sheet preparing step and the step of performing ion exchange treatment, a step of cutting the glass sheet by chemical etching or short pulse laser light. Where the polishing step is executed before the step of performing ion exchange treatment, the manufacturing method may include the polishing step either between the glass sheet preparing step and the cutting step or between the cutting step and the step of performing ion exchange treatment.

The individual steps will be described below in order.

(Step of Preparing a Glass Sheet Including Alkali Metal Ions and Having a Thickness of 0.20 mm or Smaller)

It suffices that a glass sheet used in the embodiment contain alkali metal ions, and the glass sheet may have any of various compositions as long as the composition allows shaping and strengthening by chemically strengthening treatment. Among these compositions, compositions containing sodium are preferable; examples glass sheets having such compositions are sheets of aluminosilicate glass, soda-lime glass, borosilicate glass, lead glass, alkali barium glass, and alumino borosilicate glass.

There are no particular limitations on the manufacturing method of a glass sheet. A glass sheet can be manufactured by putting prescribed glass materials into a continuous melting furnace, melting the glass materials by heating them preferably at 1,500° C. to 1,600° C., clarifying resulting molten glass, and supplying it to a shaping machine. The molten glass is shaped into a sheet form and then cooled gradually, Various methods can be employed for the glass shaping, examples of which are down draw methods such as an overflow down draw method, a slot down method, and a redraw method; a float method, a roll out method, and a press method.

If necessary, a shaped glass sheet may be thinned into a desired thickness by slimming treatment such as chemical etching, grinding, or polishing. The slimming treatment may be a known method, and chemical etching is preferable because it can remove minute flaws in the glass surface easily and provides the advantages of the invention more properly.

The thickness of glass sheet is 0.20 mm or smaller. The thickness of 0.20 mm or smaller may be obtained either by performing slimming treatment or not performing slimming treatment.

There are no particular limitations on the shape of a glass sheet. A glass sheet may have any of various shapes such as a flat sheet shape having a uniform sheet thickness, a shape having a curved surface in at least one major surface, and a 3D shape having a bent portion or the like.

Although there are no particular limitations on the composition of a glass sheet, example compositions (1)-(9) described below may be employed that are expressed in mol % in terms of oxides:

(1) A glass containing $SiO_2$ at 50% to 80%, $Al_2O_3$ at 2% to 25%, $Li_2O$ at 0% to 10%, $Na_2O$ at 0% to 18%, $K_2O$ at 0% to 10%, MgO at 0% to 15%, CaO at 0% to 5%, and $ZrO_2$ at 0% to 5%;

(2) A glass containing $SiO_2$ at 50% to 74%, $Al_2O_3$ at 1% to 10%, $Na_2O$ at 6% to 14%, $K_2O$ at 3% to 11%, MgO at 2% to 15%, CaO at 0% to 6%, and $ZrO_2$ at 0% to 5% in which the total content of $SiO_2$ and $Al_2O_3$ is 75% or lower, the total content of $Na_2O$ and $K_2O$ is 12% to 25%, and the total content of MgO and CaO is 7% to 15%;

(3) A glass containing $SiO_2$ at 68% to 80%, $Al_2O_3$ at 4% to 10%, $Na_2O$ at 5% to 15%, $K_2O$ at 0% to 1%, MgO at 4% to 15%, and $ZrO_2$ at 0% to 1%;

(4) A glass containing $SiO_2$ at 67% to 75%, $Al_2O_3$ at 0% to 4%, $Na_2O$ at 7% to 15%, $K_2O$ at 1% to 9%, MgO at 6% to 14%, $ZrO_2$ at 0% to 1.5%, and CaO at lower than 1% (if it is contained) in which the total content of $SiO_2$ and $Al_2O_3$ is 71% to 75% and the total content of $Na_2O$ and $K_2O$ is 12% to 20%;

(5) A glass containing $SiO_2$ at 65% to 75%, $Al_2O_3$ at 0.1% to 5%, MgO at 1% to 6%, CaO at 1% to 15%, and $Na_2O+K_2O$ at 10% to 18%;

(6) A glass containing $SiO_2$ at 60% to 72%, $Al_2O_3$ at 1% to 10%, MgO at 5% to 12%, CaO at 0.1% to 5%, $Na_2O$ at 13% to 19%, $K_2O$ at 0% to 5% in which $RO/(RO+R_2O)$ is 0.20 or larger and 0.42 or smaller (RO is the content of alkali earth metal oxides and $R_2O$ is the content of alkali metal oxides);

(7) A glass containing $SiO_2$ at 55.5% to 80%, $Al_2O_3$ at 12% to 20%, $Na_2O$ at 8% to 25%, $P_2O_5$ at 2.5% or larger, and alkali earth metal oxides RO at 1% or larger in which RO is MgO+CaO+SrO+BaO;

(8) A glass containing $SiO_2$ at 57% to 76.5%, $Al_2O_3$ at 12% to 18%, $Na_2O$ at 8% to 25%, $P_2O_5$ at 2.5% to 10%, and alkali earth metal oxides RO at 1% or larger; and (9) A glass containing $SiO_2$ at 56% to 72%, $Al_2O_3$ at 8% to 20%, $B_2O_3$ at 3% to 20%, $Na_2O$ at 8% to 25%, $K_2O$ at 0% to 5%, MgO at 0% to 15%, CaO at 0% to 15%, $SrO_2$ at 0% to 15%, BaO at 0% to 15%, and $ZrO_2$ at 0% to 8%.

(Glass Sheet Cutting Step)

Although a desired glass sheet cutting method may be employed, it is preferable to cut a glass sheet by chemical etching or short pulse laser light.

To cut a glass sheet by chemical etching, first, resist patterns are formed by applying a resist material to the major surfaces of the glass sheet. Exposed portions of the glass sheet are etched away by an etchant using the resist patterns as masks.

To etch a glass sheet, the two major surfaces of the glass sheet are coated with a resist material and then the resist material is exposed to light via photomasks with patterns having desired external shapes. Then the exposed resist material is developed, whereby resist patterns are formed in regions, other than etching target regions, of the glass sheet. The glass sheet is cut by etching at the etching target regions. Where a wet etchant is used as an etchant, the glass sheet is etched isotropically, and glass sheets having end surfaces are obtained by peeling off the resist material.

Although there are no particular limitations on the etchant as long as it can cut a glass sheet by etching, it is preferable to, for example, cut a glass sheet by bringing an aqueous solution containing hydrofluoric acid into contact with portions to be cut away. An example aqueous solution containing hydrofluoric acid is an aqueous solution containing at least one of hydrofluoric acid, sulfuric acid, nitric acid, hydrochloric acid, and hydrofluosilicic acid. A resist material can be selected as appropriate from known materials as long as it is resistant to the etchant selected. Example resist material peeling liquids are solutions of alkalis such as KOH and NaOH.

Whereas the above-described chemical etching method is an example that employs wet etching, dry etching with fluorine gas may also be employed. Where a glass sheet is cut by chemical etching, resulting end surfaces are very high in smoothness and glass sheets having a surface state without microcracks can be obtained.

An example method for cutting glass sheet by short pulse laser light is a method of cutting a glass sheet by a known machine using, as a short pulse laser, a picosecond laser, a femtosecond laser, or an attosecond laser. Cutting a glass sheet using short pulse laser light is also preferable because also in that case resulting end surfaces of a glass sheet are high in smoothness.

It is preferable to subject only the end surfaces which are cut surfaces of a glass sheet further to chemical etching after cutting the glass sheet and before subjecting it to ion exchange treatment. This further increases the smoothness of the end surfaces of the glass sheet and improves bending strength of the glass sheet.

The chemical etching to be performed on the end surfaces which are cut surfaces of a glass sheet is explained below.

When a glass sheet is cut by chemical etching, there may occur a case that each end surface of the glass sheet has a sharp ridge at the time of completion of the penetration of sectioning grooves. It is therefore preferable to etch the end surfaces of each glass sheet so that they become arc-shaped in a sectional view even after plural glass sheets are produced by completion of the penetration of sectioning grooves.

In general, a crack(s) develops in a glass sheet if an end surface of the glass sheet has a defective portion such as a flaw and stress is concentrated on the defective portion. That is, defective portions may become a cause of strength reduction of a glass sheet. Thus, to prevent strength reduction of a glass sheet, it is important to round, sufficiently, the tips of defective portions such as flaws existing on the end surfaces. Where a glass sheet is cut by chemical etching or short pulse laser light, resulting end surfaces are free of minute flaws called microcracks and resulting glass sheets tend to be high in strength.

(Step of Performing Ion Exchange Treatment for Replacing Alkali Metal Ions Existing in a Surface(s) of a Glass Sheet with Alkali Metal Ions of Another Kind Having a Larger Ion Radius than the Alkali Metal Ions)

In the step of performing ion exchange treatment, alkali metal ions in a glass sheet are replaced by alkali metal ions of another kind having a larger ion radius than the alkali metal ions, whereby an ion-exchanged compressive stress layer is formed in a surface(s) of the glass sheet and a chemically strengthened glass sheet is obtained.

More specifically, the ion exchange treatment is treatment of replacing alkali metal ions having a small ion radius such as Li ions or Na ions existing in a surface(s) of a glass sheet with alkali metal ions having a larger ion radius such as Na ions or K ions for Li ions and K ions for Na ions at a temperature that is lower than or equal to a glass transition temperature. As a result, compressive stress remains in the surface(s) of the glass sheet and the glass sheet is increased in strength.

The chemically strengthening treatment is performed by causing ion exchange by bringing a glass sheet containing alkali metal ions into contact with an inorganic salt composition containing alkali metal ions having a larger ion radius than the alkali metal ions contained in the glass sheet. That is, ion exchange occurs between the alkali metal ions contained in the glass sheet and the alkali metal ions of another kind contained in the inorganic salt composition.

Known chemically strengthening treatment can be used. Where a glass sheet contains Na ions as alkali metal ions, an example inorganic salt composition is one containing potassium nitrate ($KNO_3$). From the viewpoint of increase of the life of an inorganic salt, it is preferable that the inorganic salt composition further contain at least one kind of flux selected from the group consisting of $K_2CO_3$, $Na_2CO_3$, $KHCO_3$, $NaHCO_3$, $K_3PO_4$, $Na_3PO_4$, $K_2SO_4$, $Na_2SO_4$, KOH, and NaOH. Na ions in a glass sheet are replaced by K ions in an inorganic salt composition by bringing the glass sheet into contact with the inorganic salt composition.

Example methods for bringing a glass sheet into contact with an inorganic salt composition are a method of applying an inorganic salt composition in paste form to a glass sheet, a method of spraying an aqueous solution of an inorganic salt composition onto a glass sheet, and a method of immersing a glass sheet in a salt bath of a molten salt heated to a melting temperature or higher. Among these methods, the method of immersing a glass sheet in a molten salt is preferable.

Where chemically strengthening treatment is performed by immersing a glass sheet in a molten salt, first, the glass sheet is preheated and the temperature of the molten salt is adjusted to a temperature at which to perform the chemically strengthening treatment. The glass sheet that has been preheated to, for example, 100° C. or higher is immersed in the molten salt in a salt bath for a prescribed time, lifted up from the molten salt, and cooled by leaving it as it is. A chemically strengthened glass sheet is thus obtained.

The chemically strengthening temperature, that is, the temperature of a molten salt, may be a strain temperature of a glass sheet or lower. Usually, the strain temperature of a glass sheet is about 500° C. to 600° C. To obtain a larger compressive stress layer depth DOL, it is preferable that temperature of a molten salt be 350° C. or higher. To shorten the processing time and accelerate formation of a low-density layer, it is even preferable that the temperature of a molten salt be 400° C. or higher, further preferably 430° C. or higher.

The time of immersion of a glass sheet in a molten salt is preferably 1 minute to 10 hours, even preferably 5 minutes to 8 hours, and further preferably 10 minutes to 4 hours. Where the immersion time is in this range, a chemically strengthened glass sheet can be obtained in which the strength and the compressive stress layer depth DOL are balanced well.

Where acid treatment (described later) is performed after the ion exchange treatment, it is preferable to set the water vapor content in a molten salt high when a glass sheet is immersed therein because in that case the thickness of a low-density layer formed in the glass sheet by the acid treatment can be increased. If the thickness of a low-density layer formed in the glass sheet is made larger than or equal to an average depth of cracks and latent flaws existing in a glass major surface(s) and end surfaces of a glass sheet, the cracks and latent flaws can be removed together with the low-density layer in removing the low-density layer in a later step of bringing the glass sheet into contact with an alkali. As a result, the bending strength of a resulting chemically strengthened glass sheet can be increased and a foldable chemically strengthened glass sheet can be realized that can be bent so as to have a bend radius R that is, for example, 5 mm or shorter.

Where ion exchange treatment is performed under such conditions as to set high the water vapor content in a molten salt in which a glass sheet is immersed, it is preferable to perform the ion exchange treatment in an atmosphere that is 20° C. or higher in dew point temperature, even preferably 30° C. or higher, further preferably 40° C. or higher, and particularly preferably 50° C. or higher. The upper limit of the dew point temperature is preferably lower than or equal to the temperature of an inorganic salt composition such as a molten salt that is used for the ion exchange treatment.

As for the dew point temperature, it suffices that the dew point temperature of at least an atmosphere in the vicinity of the interface with the molten salt be in the above range. The expression "an atmosphere in the vicinity of the interface" means an atmosphere in a region of 200 mm or less from the interface with the molten salt. A dew point temperature can be measured by a dew point converter Vaisala DRYCAP (registered trademark) DMT346. In this specification, the term "dew point temperature" is a temperature at which an equilibrium is considered to be established between a molten salt and an atmosphere in the vicinity of the interface with the molten salt.

A dew point temperature in the above range can be attained by introducing water vapor into the molten salt or the atmosphere in the vicinity of the interface before or during the process of performing ion exchange treatment. For example, water vapor can be introduced into the molten salt and/or the atmosphere in the vicinity of the interface with the molten salt by adding a water vapor supply unit to the molten salt bath.

More specifically, water vapor itself supplied from the vapor supply unit, gas containing water vapor or water as a liquid may be introduced by bubbling directly into the molten salt, or water vapor or gas containing water vapor may be introduced into a space over the molten salt. As a further alternative, water vapor may be introduced into the molten salt by dripping water itself as a liquid onto it in such a range as not to cause water vapor explosion. As gas to contain water vapor, gas that does not influence the chemically strengthening treatment can be used. For example, gas containing water vapor can be obtained by introducing dry gas such as air, nitrogen gas, or carbon dioxide into heated water.

In introducing water vapor, gas containing water vapor, or water as a liquid, stirring a molten salt is not indispensable. However, stirring a molten salt is preferable because it shortens the time taken until an equilibrium is reached. A judgement that an equilibrium has been reached can be made when the dew point temperature of an atmosphere has been stabilized at a constant temperature.

Any of conventional methods can be employed to produce an atmosphere that is 20° C. or higher in dew point temperature in any of the above-described manners.

It is preferable to further performing a process of cleaning a glass sheet after it was subjected to chemically strengthening treatment. The cleaning process cleans a glass sheet using industrial water, ion-exchanged water, or the like. Industrial water that was, if necessary, subjected to a certain process is used. Use of ion-exchanged water is preferable.

The cleaning conditions depend on a cleaning liquid used. Where ion-exchanged water is used, it is preferable to perform cleaning at 0° C. to 100° C. from the viewpoint of removing stuck salt completely. The cleaning process can employ any of various methods such as a method of immersing a chemically strengthening glass in a water tank containing ion-exchanged water or the like, a method of exposing glass surfaces to flowing water, and a method of spraying cleaning liquid to glass surfaces from a shower.

It is preferable that a chemically strengthened glass be subjected to an acid treatment step and an alkali treatment step in this order.

The acid treatment step replaces Na and/or K existing in the surfaces of a chemically strengthened glass with H by immersing it in an acidic solution. As a result, a surface compressive stress layer of the glass surface comes to further have a layer that is changed in property, more specifically, a low-density layer that is lowered in density. This low-density layer will be removed by the subsequent alkali treatment step.

As the low-density layer formed by the acid treatment step is thicker, the amount of a glass surface layer that will be removed by the subsequent alkali treatment step will be larger. It is preferable that the thickness of the low-density layer be larger than or equal to an average depth of cracks and latent flaws because these cracks and latent flaws will also be removed when the low-density layer is removed in the alkali treatment. That is, from the viewpoint of the ease of removal of a glass surface layer, the thickness of the low-density layer is preferably 50 nm or larger, even preferably 100 nm or larger, and further preferably 150 nm or larger.

From the viewpoint of the ease of removal of a glass surface layer, it is preferable that the density of the low-density layer be lower than in a region that is deeper than the compressive stress layer formed by the ion exchange, that is, lower than a bulk density.

A thickness of the low-density layer is determined from a period $\Delta\theta$ measured by an X-ray reflectometry (XRR). A density of the low-density layer is determined from a critical angle ($\theta c$) measured by XRR. Formation and a thickness of a low-density layer can be checked briefly by observing a glass cross section by a scanning electron microscope (SEM).

It is preferable to perform, after the acid treatment process, alkali treatment on a chemically strengthened glass sheet as preferably cleaned by a process that is similar to the above-described process of cleaning a glass sheet.

The alkali treatment is performed by immersing a chemically strengthened glass in a basic solution. All or part of the low-density layer formed by the acid treatment process can be removed by the alkali treatment.

There are no particular limitations on the solution as long as it is alkaline, i.e., its pH is larger than 7. Weak base or strong base may be used. More specifically, a base such as sodium hydroxide, potassium hydroxide, potassium carbonate, or sodium carbonate is preferable. Such bases may be used either singly or in combination.

All or part of the low-density layer formed by intrusion of H can be removed by the alkali treatment together with cracks and latent flaws existing in the glass surface. It is preferable that the glass sheet be cleaned also after the alkali treatment by a process that is similar to the above-described process of cleaning a glass sheet.

(Process of Polishing at Least One Major Surface of a Glass Sheet)

At least one major surface of a glass sheet is polished at least one of before and after the ion exchange treatment. As a result, the core roughness depth Sk and the mean summit curvature Ssc of at least one major surface of a finally obtained chemically strengthened glass are made 0.90 nm or smaller and $13.0\times10^{-4}$/nm or smaller, respectively.

The polishing process is preferably executed at least after the ion exchange treatment.

It is preferable that the polishing process include a process of polishing a glass sheet using colloidal silica as abrasive grains. This makes the crack strength of a resulting chemically strengthened glass sheet of 0.2 mm or smaller in thickness higher than a chemically strengthened glass sheet that is unprocessed, that is, has not been subjected to the polishing step. This advantage is more remarkable when a polishing step using cerium oxide as abrasive grains is executed before the polishing step using colloidal silica as abrasive grains.

That is, it is even preferable that the polishing process include a process of polishing a glass sheet using cerium oxide as abrasive grains and a subsequent process of polishing the glass sheet using colloidal silica as abrasive grains.

By polishing a glass sheet using colloidal silica as abrasive grains, concave and convex of a glass surface, in particular, protruding peaks, are scraped away, whereby the core roughness depth Sk and the mean summit curvature Ssc as well as the density of summits Sds can be decreased.

From the viewpoint of maintaining the polishing properties, the average particle diameter of colloidal silica is preferably 1 nm or larger in terms of an average secondary particle diameter, even preferably 5 nm or larger, and further preferably 10 nm or larger. On the other hand, from the viewpoint of making the density of abrasive particles higher than or equal to a prescribed value, the average particle diameter of colloidal silica is preferably 100 nm or smaller, even preferably 90 nm or smaller, and further preferably 80 nm or smaller. An average secondary particle diameter of colloidal silica is measured by a particle size analyzer of, for example, a laser light diffraction or scattering type using a dispersion liquid obtained by dispersing it in a dispersion medium such as pure water.

From the viewpoint of maintaining polishing properties, the depth of polishing using colloidal silica as abrasive grains is preferably 10 nm or higher, even preferably 20 nm or higher, and further preferably 30 nm or higher. From the viewpoint of preventing warping of a glass sheet, the polishing depth is preferably 9 μm or lower, even preferably 7 μm or lower, and further preferably 5 μm or lower.

From the viewpoint of maintaining polishing properties, the polishing pressure of polishing using colloidal silica as abrasive grains is preferably 1 kPa or higher, even preferably 2 kPa or higher, and further preferably 3 kPa or higher. From the viewpoint of preventing breaking of a substrate, the polishing pressure is preferably 100 kPa or lower, even preferably 90 kPa or lower, further preferably 80 kPa or lower.

From the viewpoint of maintaining polishing properties, the rotation speed of a surface plate of a polishing machine for polishing a glass sheet using colloidal silica as abrasive grains is preferably such that the circumferential speed at the outermost circumference is 1 m/min or higher, further preferably 3 m/min or higher, and further preferably 5 m/min or higher. From the viewpoint of preventing formation of polishing scratches, the rotation speed is preferably such that the circumferential speed at the outermost circumference is 90 m/min or lower, even preferably 80 m/min or lower, and further preferably 70 m/min or lower.

The abrasive grains may contain, in addition to colloidal silica, other known kinds of abrasive grains such as nanoceria fine particles and nanoalumina fine particles within such a range that the advantages of the invention are not impaired.

Although there are no particular limitations on the kind of colloidal silica as long as it can be used as abrasive grains, colloidal silica can be used that is manufactured by, for example, a method of preparing it by dispersing polishing particles containing colloidal particles in water such as pure water. Among various kinds of colloidal silica, colloidal silica that is high in dispersibility is preferable.

It suffices that the abrasive grains contain silica particles. Where two or more kinds of abrasive grains are used, it is preferable that the content of silica particles in the abrasive grains be 1 mass % or higher, even preferably 5 mass % or higher, and particularly preferably 100% (i.e., no other kinds of abrasive grains are contained).

From the viewpoint of maintaining polishing properties, the density of silica particles of colloidal silica is preferably 1 mass % or higher, even preferably 5 mass % or higher, and further preferably 10 mass % or higher. From the viewpoints of preventing erosion and formation of polishing scratches, the density of silica particles of colloidal silica is preferably 50 mass % or lower, even preferably 45 mass % or lower, and further preferably 40 mass % or lower.

If necessary, colloidal silica may contain, as appropriate, other components (optional components) such as a surfactant and an oxidation inhibitor.

Where cerium oxide particle is used as abrasive grains, a glass sheet or a chemically strengthened glass can be polished at a high polishing rate. This is suitable for decreasing the density of summits Sds by scraping away particularly protruding peaks among concave and convex of a glass surface. Among the advantages of the polishing using colloidal silica as abrasive grains, in particular, reduction of the core roughness depth Sk and the mean summit curvature Ssc can be attained more effectively by performing polishing using colloidal silica as abrasive grains in the above-described manner after performing polishing using cerium oxide as abrasive grains for rough finishing.

From the viewpoint of maintaining polishing properties, the average particle diameter of cerium oxide is preferably 0.05 μm or larger in terms of the average secondary particle diameter, even preferably 0.1 μm or larger, and further preferably 0.5 μm or larger. On the other hand, from the viewpoint of setting the density of abrasive grains higher than or equal to a prescribed value, the average particle diameter be 5 μm or smaller, even preferably 4 μm or smaller, and further preferably 3 μm or smaller. An average secondary particle diameter of cerium oxide is measured using a particle size analyzer of, for example, a laser light diffraction or scattering type using a dispersion liquid obtained by dispersing it in a dispersion medium such as pure water.

From the viewpoint of maintaining polishing properties, the depth of polishing using cerium oxide as abrasive grains is preferably 10 nm or higher, even preferably 20 nm or higher, and further preferably 30 nm or higher. From the viewpoint of preventing warping of a glass sheet, the polishing depth is preferably 9 μm or lower, even preferably 7 μm or lower, and further preferably 5 μm or lower.

From the viewpoint of maintaining polishing properties, the polishing pressure of polishing using cerium oxide as abrasive grains is preferably 1 kPa or higher, even preferably 2 kPa or higher, and further preferably 3 kPa or higher. From the viewpoint of preventing breaking of a substrate, the polishing pressure is preferably 100 kPa or lower, even preferably 90 kPa or lower, further preferably 80 kPa or lower.

From the viewpoint of maintaining polishing properties, the rotation speed of a surface plate of a polishing machine for polishing a glass sheet using cerium oxide as abrasive grains is preferably such that the circumferential speed at the outermost circumference is 1 m/min or higher, further preferably 3 m/min or higher, and further preferably 5 m/min or higher. From the viewpoint of preventing formation of polishing scratches, the rotation speed is preferably such that the circumferential speed at the outermost circumference is 90 m/min or lower, even preferably 80 m/min or lower, and further preferably 70 m/min or lower.

The abrasive grains may contain, in addition to cerium oxide (ceria), other known kinds of abrasive grains within such a range that the advantages of the invention are not impaired. Examples of other known kinds of abrasive grains are fine particles including metal oxides such as silicon oxide (silica), aluminum oxide (alumina), zirconium oxide (zirconia), titanium oxide (titania), chromium oxide, iron oxide, tin oxide, zinc oxide, germanium oxide, and manganese oxide, diamond, silicon carbide, boron carbide, or boron nitride.

There are no particular limitations on the type of cerium oxide particles as long as they are particles used as abrasive grains; for example, cerium oxide particles manufactured by the method disclosed in JP-A-H11-12561 or JP-A-2001-35818 can be used. That is, cerium oxide particles obtained by producing cerium hydroxide gel by adding an alkali to an aqueous solution of ammonium cerium (IV) nitrate and filtering, cleaning, and firing it or cerium oxide particles obtained by pulverizing, firing, again pulverizing, and classifying high-purity cerium carbonate can be used. Cerium oxide particles obtained by oxidizing a cerium (III) salt chemically in a liquid can also be used (refer to JP-T-2010-505735).

It suffices that abrasive grains contain cerium oxide. Where two or more kinds of abrasive grains are used, the content of cerium oxide in the abrasive grains is preferably 1 mass % or higher, even preferably 5 mass % or higher, and particularly preferably 100% (i.e., no other kinds of abrasive grains are contained).

A polishing composition in which abrasive grains are dispersed in water or a water-soluble medium is used for polishing. From the viewpoint of maintaining polishing properties, the content of cerium oxide in the polishing composition is preferably 1 mass % or higher, even preferably 5 mass % or higher, and further preferably 10 mass % or higher. From the viewpoint of preventing formation of polishing scratches, the content of cerium oxide in the polishing composition is preferably 50 mass % or lower, even preferably 45 mass % or lower, and further preferably 40% or lower.

Since water or a water-soluble medium is used as a dispersion medium, the polishing composition should contain water as an indispensable component. The water is preferably pure water which has been ion-exchanged and from which foreign substances have been removed. Water-soluble alcohol, water-soluble polyol, water-soluble ester, water-soluble ether, etc. can be used as the water-soluble medium. Among these examples, use of a dispersion medium made up of only water is even preferable.

From the viewpoint of preventing damage to a glass substrate, it is preferable to set the pH of the polishing composition in a range of 2.0 to 11.0. The polishing composition may contain any of various kinds of inorganic acids and organic acids, their salts, and alkaline compounds as pH regulator. They can be known ones.

If necessary, the polishing composition may contain, as an optional component, an anti-rust agent, a dispersant, an oxidizing agent, a lubricant, a tackifier or a viscosity modifier, an antiseptic agent, or the like as appropriate.

The anti-rust agent can be a known one, examples of which are a nitrogen-containing heterocycle compound and a nonionic surfactant.

The dispersant can be a known one, examples of which are anionic, cationic, and amphoteric surfactants and anionic, cationic, and amphoteric polymer compounds. The polishing composition may contain one or more of these kinds of dispersants.

An example of the oxidizing agent is a peroxide having an oxygen-oxygen bond that generates a radical when it is broken by external energy such as heat or light. However, it is preferable that the polishing composition contain no oxidizing agent.

EXAMPLES

Although the invention will be hereinafter described in more detail using Inventive Examples and Comparative Examples, the invention is not limited to the following Examples. Examples 1-4 are Inventive Examples and Examples 5-9 are Comparative Examples.

Example 1

A glass sheet A of 300 mm×210 mm×0.4 mm (thickness) was prepared.

The glass sheet A had a glass composition including, in mol % in terms of oxides, $SiO_2$ at 64.45%, $Al_2O_3$ at 10.5%, $Na_2O$ at 16%, $K_2O$ at 0.6%, MgO at 8.3%, $ZrO_2$ at 0.15%, and $TiO_2$ at 0.04%.

The glass sheet A was slimmed into a thickness 0.10 mm by chemical etching with an etchant. The etchant was obtained by adding hydrofluoric acid at 2 mol/L and hydrochloric acid at 4 mol/L to a solvent that was water.

The glass sheet A having a thickness 0.10 mm was then cut by short pulse laser light into a size 49 mm×49 mm×0.10 mm (thickness).

A molten salt was prepared by putting potassium nitrate of 40 kg into a pot made of stainless steel (SUS) and heating it to 430° C. by a mantle heater.

After the glass sheet A thus prepared was preheated to 350° C. to 400° C., it was subjected to chemically strengthening treatment in which it was immersed in the molten salt at 370° C. for 15 minutes to cause ion exchange and then cooled to about room temperature. A resulting chemically strengthened glass sheet was washed by water and dried. Both major surfaces of the chemically strengthened glass sheet had a surface compressive stress value CS of 950±50 MPa and a compressive stress layer depth DOL of 5±1 μm. At this time, the minimum bend radius was 5 mm.

Then a polishing composition A was prepared by dispersing cerium oxide (SHOROX (registered trademark) NX23 produced by Showa Denko K.K., average particle diameter: 1 to 2 μm) in ion-exchanged water. The polishing composition A had pH 8 and a cerium oxide content 30 mass %.

The chemically strengthened glass was polished using the polishing composition with a polishing pressure 5 kPa and a rotation speed that is a circumferential speed at the outermost circumference 40 m/min so that a polishing depth was 400 nm.

Subsequently, polishing was performed using colloidal silica (Memolead produced by Kao Corporation, average particle diameter 20 nm). The concentration of silica particles in the colloidal silica was 40 mass %. Polishing was performed with a polishing pressure 5 kPa and a rotation speed that is a circumferential speed at the outermost circumference 40 m/min so that a polishing depth was 100 nm.

A chemically strengthened glass of Example 1 having a thickness 0.10 mm was thus obtained.

Example 2

A chemically strengthened glass of Example 2 was obtained in the same manner as in Example 1 except that a chemically strengthened glass was etched with hydrofluoric acid before being polished using cerium oxide as abrasive grains, the polishing depth of polishing using cerium oxide as abrasive grains was 100 nm, and the polishing depth of polishing using colloidal silica as abrasive grains was 30 nm.

The etching with hydrofluoric acid was performed using a solution obtained by adding hydrofluoric acid at 0.5 mol/L and hydrochloric acid at 3 mol/L to water as solvent so that the removal depth of a major surface was 1,000 nm.

Example 3

A chemically strengthened glass of Example 3 was obtained in the same manner as in Example 1 except that polishing using cerium oxide as abrasive grains was not performed and the polishing depth of polishing using colloidal silica as abrasive grains was 30 nm.

Example 4

A chemically strengthened glass of Example 4 was obtained in the same manner as in Example 1 except that a chemically strengthened glass was etched with hydrofluoric acid before being polished using colloidal silica as abrasive grains, no polishing using cerium oxide as abrasive grains was performed, and the polishing depth of the polishing using colloidal silica as abrasive grains was 100 nm.

The etching with hydrofluoric acid was performed under the same conditions as in Example 2 and the polishing depth of a major surface was 1,000 nm.

Example 5

A molten salt containing potassium carbonate at 6 mol % and sodium at 2,000 weight ppm was prepared by putting potassium nitrate of 36.490 kg, potassium carbonate of 3.215 kg, and sodium nitrate of 296 g into a pot made of stainless steel (SUS) and heating them to 430° C. by a mantle heater. The molten salt was caused to contain water vapor by flowing air, obtained by introducing air into water heated to 70° C., at a rate of 40 L/min through an atmosphere located in the vicinity of the interface with the molten salt.

More specifically, air was used as a dried gas and humidified by causing it to flow through water heated to 70° C. in a water tank, whereby a humidified gas (air) B containing water vapor was obtained.

A dew point temperature control in the ion exchange process was performed by introducing the gas B containing water vapor into a space over the molten salt (inorganic salt composition) in the bath for the chemically strengthening treatment through a path that was heated by a ribbon heater. A water vapor supply rate per 1 $cm^3$ was 0.2 mg/min and the dew point temperature in the vicinity of the interface with the molten salt was 55° C.

After a glass sheet A prepared as described above was preheated to 350° C. to 400° C., it was subjected to chemically strengthening treatment in which it was immersed in the molten salt at 370° C. for 15 minutes to cause ion exchange and then cooled to about room temperature. A resulting chemically strengthened glass was washed by water and dried.

Then nitric acid of 6.0 wt % (nitric acid 1.38 produced by Kanto Chemical Co., Inc. was diluted by ion-exchanged water) was prepared in a beaker and its temperature was adjusted to 50° C. using a water bath. The chemically strengthened glass that had been subjected to the ion exchange treatment was immersed in this solution for 180 sec to perform acid treatment. The glass was then washed by water.

Subsequently, a sodium hydroxide aqueous solution of 4.0 wt % (48% sodium hydroxide solution produced by Kanto Chemical Co., Inc. was diluted by ion-exchanged water) was prepared in a beaker and its temperature was adjusted to 50° C. using a water bath. The chemically strengthened glass subjected to the acid treatment and the cleaning was subjected to alkali treatment by immersing it in this sodium hydroxide aqueous solution for 180 sec. The glass was then washed by water and dried, whereby a chemically strengthened glass of Example 5 was obtained. No polishing was performed.

The removal depth of the major surface by the acid treatment and alkali treatment was 30 nm.

Example 6

A chemically strengthened glass of Example 6 was obtained by performing the same chemically strengthening treatment as in Example 1 and the same etching using hydrofluoric acid as in Example 2. No polishing was performed. The removal depth of the major surface by the etching using hydrofluoric acid was 1,000 nm.

Example 7

Acid treatment and alkali treatment were performed after the same chemically strengthening treatment as in Example 5. Then no polishing using cerium oxide as abrasive grains was performed and polishing using colloidal silica as abrasive grains was performed. The polishing using colloidal silica as abrasive grains was performed in the same manner as in Example 1 except that the polishing depth was 70 nm. A chemically strengthened glass of Example 7 was thus obtained.

Example 8

A chemically strengthened glass of Example 8 was obtained in the same manner as in Example 1 except that no polishing using colloidal silica as abrasive grains was performed and polishing using cerium oxide as abrasive grains was performed with a polishing depth 100 nm.

Example 9

A chemically strengthened glass of Example 9 was obtained by performing none of polishing, acid treatment, and alkali treatment after the same chemically strengthening treatment as in Example 1 was performed.

(Core Roughness Depth Sk, Mean Summit Curvature Ssc, and Density of Summits Sds)

A polished-side major surface of a chemically strengthened glass was subjected to a surface analysis using an atomic force microscope (AFM) (WPA-100 produced by Park Systems). Values of a core roughness depth Sk, a mean summit curvature Ssc, and a density of summits Sds were determined by analyzing a result of the above surface analysis using SPIP software. Where no polishing was performed, either major surfaces may be used as an analysis target because the chemically strengthening treatment, the acid treatment, and the alkali treatment were performed on both major surfaces under the same conditions. Results are shown in Table 1 and FIGS. 2-4.

(Crack Strength)

Crack strength of a chemically strengthened glass was evaluated by performing a pen drop test under the following conditions.

FIG. 5 is a schematic sectional view showing a test method. A stage was prepared in which a PET (polyethylene terephthalate) film 2 was bonded to a stone surface plate 3 by an OCA (optical clear adhesive) sheet. The PET film 2 was 100 μm in thickness and 4 GPa in elastic modulus.

A chemically strengthened glass 1 was placed on the PET film 2 with its first major surface 1a up. The second major surface 1b of the chemically strengthened glass 1 was a polished-side major surface. Where no polishing was performed, either major surfaces could be made the second major surface 1b because chemically strengthening treatment, acid treatment, and alkali treatment were performed under the same conditions for both first major surface 1a and second major surface 1b.

A pen 4 was fixed to a drop assist pipe 5 made of acrylic resin over the chemically strengthened glass 1 and only the pen 4 was caused to drop from a prescribed height. The tip of the pen 4 had a ball that was 0.5 mm in diameter and made of stainless steel.

The height from which the pen 4 was dropped onto the major surface of the chemically strengthened glass 1 was increased in units of 5 mm and a height h from the first major surface 1a of the chemically strengthened glass 1 to the tip of the pen 4 when a crack(s) occurred in the second major surface 1b of the chemically strengthened glass 1 was measured. This measurement was performed at least five times and an average height was employed as a crack height of the pen drop test. A crack height of the pen drop test that was larger than or equal to 10 cm is judged good, and a crack height that is 12 cm or larger is preferable. Results are shown in Table 1.

TABLE 1

| | Removal depth (nm) | | | | | | | Crack height (cm) |
|---|---|---|---|---|---|---|---|---|
| | Etching | Chemical strengthening/acid and alkali treatment | Cerium oxide polishing | Colloidal silica polishing | Sk (nm) | Ssc (/nm) | Sds (/μm$^2$) | |
| Ex. 1 | 0 | 0 | 400 | 100 | 0.444 | $6.46 \times 10$ | 66.2 | 13.9 |
| Ex. 2 | 1,000 | 0 | 100 | 30 | 0.550 | $12.8 \times 10^{-4}$ | 111 | 12.8 |
| Ex. 3 | 0 | 0 | 0 | 30 | 0.745 | $8.39 \times 10^{-4}$ | 122 | 12.3 |
| Ex. 4 | 1,000 | 0 | 0 | 100 | 0.750 | $11.8 \times 10^{-4}$ | 112 | 11.1 |
| Ex. 5 | 0 | 30 | 0 | 0 | 2.27 | $23.2 \times 10^{-4}$ | 91.9 | 9.80 |
| Ex. 6 | 1,000 | 0 | 0 | 0 | 1.58 | $17.3 \times 10^{-4}$ | 119 | 9.80 |
| Ex. 7 | 0 | 30 | 0 | 70 | 0.492 | $21.4 \times 10^{-4}$ | 234 | 8.75 |
| Ex. 8 | 0 | 0 | 100 | 0 | 1.03 | $12.8 \times 10^{-4}$ | 64.3 | 6.15 |
| Ex. 9 | 0 | 0 | 0 | 0 | 1.78 | $22.5 \times 10^{-4}$ | 113 | 5.45 |

The results in Table 1 and FIG. 2 show a tendency that the crack strength in the pen drop test increases as the core roughness depth Sk decreases. More specifically, the core roughness depth Sk was decreased effectively in all the Examples belonging to the group in which colloidal silica polishing was performed (plotted in black in FIG. 2). Furthermore, whereas the average crack height of the pen drop test in Example 9 which was subjected to only the chemically strengthening treatment was as small as 5.45 cm, in the group in which colloidal silica polishing was performed (plotted in black in FIG. 2) the average crack heights of the pen drop test had a maximum value 13.9 cm which was about 2.6 times the above value. It has been found from this fact that the reduction in core roughness depth Sk that is caused by the colloidal silica polishing is effective in increasing the crack height of the pen drop test.

However, merely the finding from FIG. 2 that the core roughness depth Sk correlates with the crack strength to some extent is insufficient for interpretation of the crack strength, that is, insufficient for satisfactory regression. Thus, to explain the mechanism of the variation of the crack height of the pen drop test with respect to the core roughness depth Sk in the group in which colloidal silica polishing was performed, the inventors further paid attention to the mean summit curvature values Ssc in the group in which colloidal silica polishing was performed (see Table 1 and FIG. 3). The inventors have found that the crack strength in the pen drop test decreases as the mean summit curvature Ssc increases, that is, a correlation exists between the mean summit curvature Ssc and the crack strength in the pen drop test. This is explained as follows: in the pen drop test, local stress concentration tends to occur at large-curvature summits to cause cracking, that is, to serve as driving force of local destruction. In particular, the mean summit curvature Ssc was smallest and the crack height of the pen drop test was largest in Example 1 (see FIG. 3) in which cerium oxide polishing was performed before colloidal silica polishing. It has therefore been found that such composite polishing is also effective.

Based on the above results, it has been found that high crack strength can be obtained when the core roughness depth Sk of a major surface of a chemically strengthened glass is made 0.90 nm or smaller and the mean summit curvature Ssc is made $13.0 \times 10^{-4}$/nm or smaller.

In addition to the above findings, it has been found that the density of summits Sds and the crack strength also have a certain correlation as shown in table 1 and FIG. 4. This is explained as follows: as the density of summits Sds decreases, the flatness of a glass surface becomes higher and the number of protruding portions decreases that could become an origin of stress concentration when impact of the pen drop test is received, whereby the crack strength in the pen drop test becomes higher. More specifically, the density of summits Sds was lowest and the crack strength in the pen drop test was highest in the group in which cerium oxide polishing was performed before colloidal silica polishing (Examples 1 and 2 in FIG. 4), which means combining these kinds of polishing would be effective. That is, a tendency was found that in the group in which the crack strength in the pen drop test was high as a whole, not only the core roughness depth Sk and the mean summit curvature Ssc were small but also the density of summits Sds was low.

The present application is based on Japanese Patent Application (No. 2021-053744) filed on Mar. 26, 2021 and the entirety of which is incorporated herein by reference.

DESCRIPTION OF SYMBOLS

1: Chemically strengthened glass
  1a: First major surface
  1b: Second major surface
  1α, 1β: end portion
2: PET film
3: Stone 14
4: Pen
5: Drop assist pipe
100: Bending test machine
12: Base
14: Upper support board (first support board)
  14a: Support surface
16: Lower support board (second support board)
  16a: Support surface
200: Moving member
21: Elevation frame
22: Motor
23: Ball screw mechanism
24: Slider block
300: Adjustment member
40: Detection member
50: Support portion
52: Link portion
60: Placement portion

What is claimed is:

1. A chemically strengthened glass comprising alkali metal ions,
having a thickness of 0.20 mm or smaller, and
having a pair of major surfaces that are opposed to each other and have been subjected to a chemically strengthening treatment,
wherein at least one of the pair of major surfaces has a core roughness depth Sk of 0.90 nm or smaller and a mean summit curvature Ssc of $13.0 \times 10^{-4}$/nm or smaller.

2. The chemically strengthened glass according to claim 1, wherein the at least one of the pair of major surfaces has a density of summits Sds of $125/\mu m^2$ or lower.

3. The chemically strengthened glass according to claim 1, that is capable of being bent so as to have a bend radius R of 20 mm or smaller.

4. The chemically strengthened glass according to claim 1, wherein at least one of the pair of major surfaces has a compressive stress layer depth of 4 µm to 30 µm.

5. The chemically strengthened glass according to claim 1, wherein at least one of the pair of major surfaces has a surface compressive stress value CS of 300 MPa to 1,400 MPa.

6. A manufacturing method of a chemically strengthened glass, the method comprising:
preparing a glass sheet having a thickness of 0.20 mm or smaller and comprising alkali metal ions;
performing an ion exchange treatment of replacing the alkali metal ions existing in a surface of the glass sheet with alkali metal ions of another kind having larger ion radius than ion radius of the alkali metal ions in the surface of the glass sheet; and
polishing at least one major surface of the glass sheet at least one of before and after the ion exchange treatment so as to obtain a core roughness depth Sk of 0.90 nm or smaller and a mean summit curvature Ssc of $13.0 \times 10^{-4}$/nm or smaller.

7. The manufacturing method of a chemically strengthened glass according to claim 6, wherein the polishing is executed using colloidal silica as abrasive grains.

8. The manufacturing method of a chemically strengthened glass according to claim 7, wherein the colloidal silica has an average particle diameter of 1 nm to 100 nm.

9. The manufacturing method of a chemically strengthened glass according to claim 7, wherein the polishing is executed using cerium oxide as abrasive grains and then executed using colloidal silica as abrasive grains.

10. The manufacturing method of a chemically strengthened glass according to claim 9, wherein the cerium oxide has an average particle diameter of 0.05 µm to 5 µm.

11. The manufacturing method of a chemically strengthened glass according to claim 6, wherein the ion exchange treatment is performed in an atmosphere having a dew point temperature of 20° C. or higher.

12. The manufacturing method of a chemically strengthened glass according to claim 6,
wherein the alkali metal ions contained in the glass sheet comprise sodium ions, and
wherein in the ion exchange treatment, by bringing the glass sheet into contact with an inorganic salt composition comprising potassium nitrate and at least one kind of flux selected from the group consisting of $K_2CO_3$, $Na_2CO_3$, $KHCO_3$, $NaHCO_3$, $K_3PO_4$, $Na_3PO_4$, $K_2SO_4$, $Na_2SO_4$, KOH, and NaOH, the sodium ions are replaced by potassium ions existing in the inorganic salt composition.

13. The manufacturing method of a chemically strengthened glass according to claim 6, further comprising cutting the glass sheet by chemical etching or short pulse laser light before executing the ion exchange treatment.

14. The manufacturing method of a chemically strengthened glass according to claim 13, wherein the cutting is executed by bringing a cutting portion into contact with an aqueous solution comprising hydrofluoric acid.

15. The manufacturing method of a chemically strengthened glass according to claim 13, further comprising chemically etching only an end surface as a cut surface after executing the cutting and before executing the ion exchange treatment.

* * * * *